April 3, 1973   J. B. ANDERSSON   3,725,130

METHOD OF MAKING TUBULAR BATTERY ELECTRODE

Filed April 12, 1971   2 Sheets-Sheet 1

INVENTORS
JOHAN B. ANDERSSON
KARL E. E. LINDBERGH

BY *Burns Doane Swecker + Mathis*
ATTORNEYS

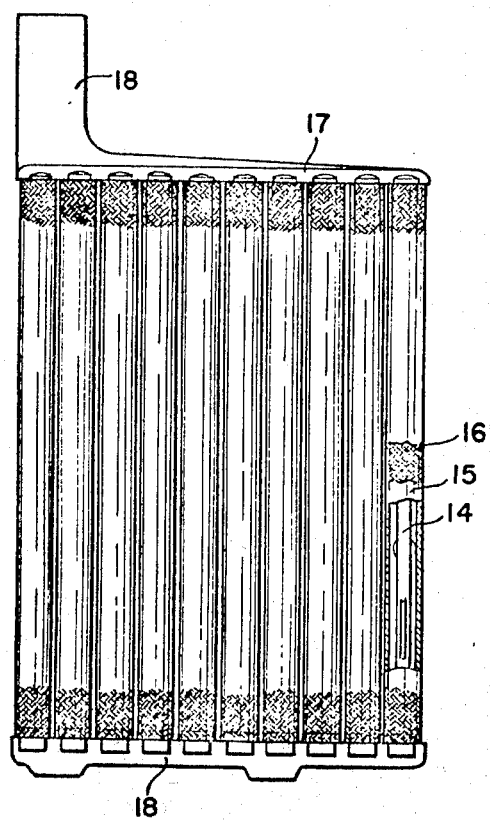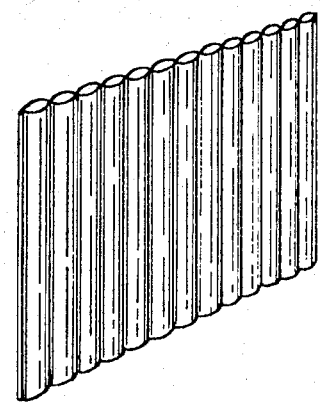

United States Patent Office 3,725,130
Patented Apr. 3, 1973

3,725,130
METHOD OF MAKING TUBULAR
BATTERY ELECTRODE
Johan B. Andersson, Lilla Edet, and Karl E. E. Lindbergh, Nol, Sweden, assignors to Aktiebolaget Tudor, Stockholm, Sweden
Filed Apr. 12, 1971, Ser. No. 132,978
Claims priority, application Sweden, Apr. 16, 1970, 5,182/70
Int. Cl. H01m 3/02
U.S. Cl. 136—63
4 Claims

ABSTRACT OF THE DISCLOSURE

Lead-acid storage battery electrode of the tube plate type having a novel sheath of a glass fiber fabric wherein the yarns are held against slippage by islands of a thermoplastic material. The sheath is made by passing a tube made of glass fiber yarns over a mandrel which extends through a chamber containing pulverized particles of plastic material. The particles are blown on the glass fiber tube while heated and form small islands of plastic material when cooled which impart the necessary mechanical strength to the sheath without substantial reduction in porosity.

---

The present invention relates to a storage battery electrode of the so-called tube type, intended primarily for lead batteries, and it relates especially to the sheath that encloses the active material of the electrode. The sheath is necessary to prevent the active material of the electrode from getting loose under the operating conditions of the electrodes. The particular characteristic of the invention is that the material in the electrode sheath is resistant to chemicals and to physical attack that occurs during charging and discharging of the battery, and at the same time, it is sufficiently porous so that the electrolyte can, practically speaking, be unhindered in penetration of the active material.

By the invention, a solution is provided for a problem that has so far been unsolved in the art. The attack to which the electrode sheath is exposed chemically is oxidation for nascent oxygen, and mechanically it is tensile stress caused by the increased volume of the active material that it encloses as a result of sulfation during the discharge periods.

Historically, the manufacture of storage electrode sheaths of slotted hard rubber tubes which were poorly resistant to oxidation and had little mechanical strength was replaced by the production of glass fiber sheaths encased in perforated plastic foils. Also, woven tubular sheaths were made of mixed plastic and glass fibers. Slotted tubes, similar in construction to those of hard rubber but consisting of polyethylene, have been used though to a lesser degree. Glass fibers have been found to be an excellent material for the intended purpose. A fabric of this material in the form of a braid or weave has the drawback, however, that the individual yarns of which the fabric is constructed do not attach themselves to each other sufficiently because of their smooth surface. Efforts have been made to overcome this disadvantage by impregnation with a thermoset resin such, for example, as a phenolic resin. However, it has been discovered that through such impregnation, the porosity of the sheath which was valuable for its proper functioning in a storage battery was lost, and this in turn resulted in inefficient use of the active material in the electrode. It was also found that the bonding of the yarns to each other was not sufficiently strong to resist stresses caused by volume increase of the active material since the yarns fixed to each other by impregnation separated readily.

Glass fiber sheaths encased in plastic foil are relatively expensive to manufacture and are relatively thick walled with the resultant disadvantage that with sheaths having equal external diameters, less active material can be accommodated in the electrode, thereby reducing the capacity of the battery.

With an electrode according to the invention, the active material is enclosed in a glass fiber material that is combined with a meltable thermoplastic material in a new way. Meltable plastic or thermoplastic materials that are electrolyte resistant can be utilized. Polyolefins, and particularly polyethylene, are preferred materials. In spite of the fact that the good properties of the glass fiber material are well known, this material could not be utilized because of the characteristics mentioned above. The suitable properties of polyethylene or other polyolefins in this connection were also well known, but since these materials only hold their shape in relatively large dimensions at the temperatures prevailing in a working battery, they have not been deemed effective for practical use in a sheath for a battery electrode.

The principal object of the present invention resides in providing a novel electrode sheath and method wherein the combination of materials have the requisite properties with respect to chemical resistance and mechanical strength, which could not be anticipated, and also, quite surprisingly, a porosity that is nearly comparable to the porosity of the glass fiber hose that is a component of the sheath. In accord with a preferred embodiment, the active material of the electrode is surrounded by one or more sheaths which in turn are constituted of a glass fiber hose or tube on which powdered polyolefin has been applied and sintered to provide islands or dots of plastic material which adheres to the yarns to thereby prevent relative movement between different yarns at their points of attachment to the same island of plastic material. It has been found that when the islands of plastic material are concentrated mainly at the crossing points of the yarns of the fabric, there is sufficient rigidity to provide a sheath having good mechanical strength.

Another object resides in providing a novel method for producing the sheath. In the sintering, the polyolefin powder pulls together the small drops that collect in contact with the yarns and causes concentrations of the plastic material along the yarn and particularly at the intersections which is especially advantageous. This phenomenon explains why the porosity is not reduced appreciably in comparison to the untreated glass fiber hose.

These and other objects will become more fully apparent from the claims and from the description as it proceeds in conjunction with the drawings wherein:

FIG. 4 is an elevation, in partial section, showing a tube-type plate electrode of the type with which the sheath of FIGS. 1 and 2 is adapted to be used;

FIG. 5 is a side view of the electrode of FIG. 4;

FIG. 6 shows a circular sheath in the form of a braid which may embody the present invention;

FIG. 7 shows a circular sheath in the form of a woven material which may embody the present invention; and FIG. 8 shows a multiple layer belt which may be sewed to form suitable electrode sheaths which may embody the present invention.

Figure 1:
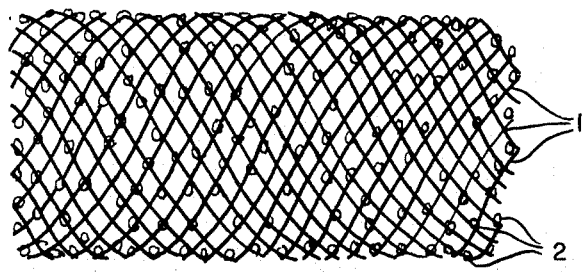
FIG. 1 is a view in section of an electrode sheath of the present invention.

Referring now to FIG. 1, the glass fiber yarns 1 are shown in the form of a braid. Small islands 2 of sintered plastic material are shown mainly at the regions where the yarns 1 cross each other. The plastic material adheres to the yarns rather than bridging over the spaces, which is important in providing the desired porosity. The fact that concentrations of the plastic material occur in the form of islands mainly at the cross-over points serves to prevent slippage or movement of the yarns relative to each other.

Figure 2:
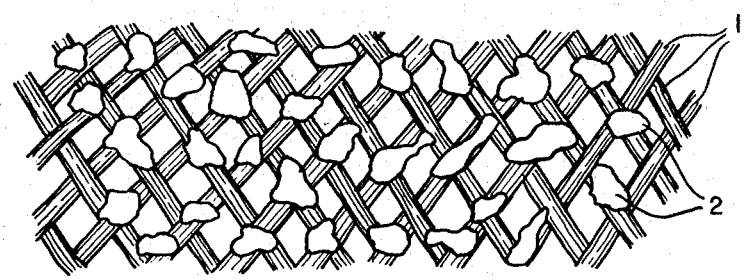
FIG. 2 is a view similar to FIG. 1 on a larger scale to illustrate how the plastic material during sintering is essentially collected along the yarns and concentrated at the intersections of the yarns.
Figure 3:
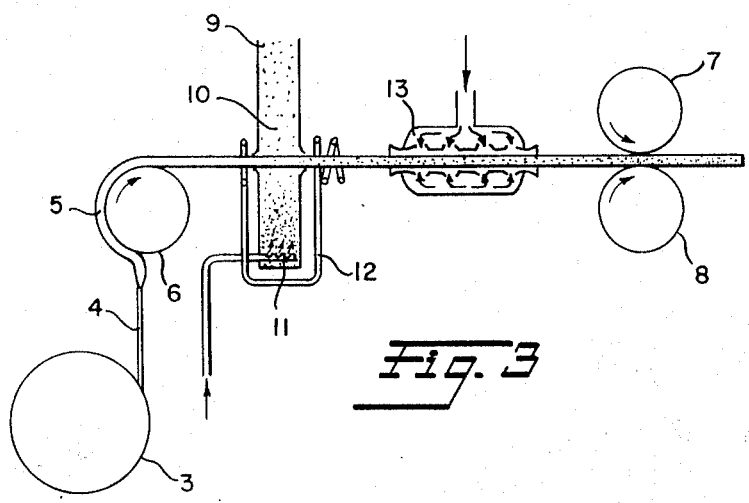
FIG. 3 is a diagrammatic view of an apparatus for production of the electrode sheath of FIGS. 1 and 2.

FIG. 3 shows a means for production of the electrode sheath of the invention. A spool 3 contains a continuous glass fiber sleeve or hose 4 that is threaded onto a metallic mandrel 5 which rests on a roll 6, rotating in the direction indicated by the arrow, which roll is covered at its periphery with friction material suitable for causing the glass fiber sleeve 4 to be fed onto mandrel 5. The other end of mandrel 5 is borne between the pair of rollers 7, 8 which likewise continuously remove the processed glass fiber sleeve. A container 9 is provided which holds pulverized plastic material in the form of a powder 10 which is fluidized by air blown in via blower openings 11. The plastic material is thermoplastic and may be a polyolefin, such as polyethylene. The glass fiber sleeve 4 is carried on mandrel 5 through the fluidized powder zone while the sleeve 4 is heated to the melting temperature of the plastic material. The heating means illustrated is a high frequency coil 12 around mandrel 5, which extends on both sides of container 9. As the powder particles are blown upwardly from the blower openings 11, the particles adhere to the glass fiber yarns in a substantially uniform fashion around the circumference of sleeve 4. By using pulverized particles that are small compared with the diameter of the yarns, there is little, if any, bridging of the space between non-intersecting yarns. It has been observed that the particles seem inherently to bunch together along the yarns of glass fiber and hence form islands which for the main part are concentrated at crossing points of the yarns of the fabric, as illustrated in FIGS. 1 and 2. The heat applied by coil 12 is sufficient to cause a sintering of the thermoplastic material to the glass fiber fabric.

Mandrel 5 passes through a cooling chamber 13. As the glass fiber sleeve passes through chamber 13, the relatively soft, small drops of plastic material harden. Cold air may be used as coolant.

The sheath, as it is removed from the end of mandrel 5 after passing rollers 7 and 8, is essentially ready for use in a fabrication of the battery electrode, as illustrated for example in FIGS. 4 and 5. As is evident from the foregoing, the glass fiber tubing is produced in a continuous length and available to be cut to suitable lengths according to the particular battery size in which it will be used.

Referring now to FIGS. 4 and 5, the electrode for a known type of lead-acid storage battery conventionally comprises a plurality of conducting grid rods 14 surrounded by active material 15 and enclosed in a sheath 16. The grid rods 14, after being inserted in a sheath 16 and the active material packed in the space between the outer surface of the rod 14 and the inner surface of sheath 16, are joined at top and bottom by cross strips 17 and 18, of which generally only the upper strip 17 is made of conductive material. A contact lug 18 connects the upper crosspiece 17 to other parallel plates and to a terminal of the battery. The sheath as described in connection with FIGS. 1–3 may be used as sheath 16.

FIG. 6 illustrates a length of sheath where the fibrous material comprises a braid, while FIG. 7 shows a length of sheath using a woven material. Either type of sheath can be used with the present invention, though with single-ply sheaths, the braiding method is preferable.

If the electrode sheath is to be made as a multiple-ply sheath with so-called cartridge belt material, as illustrated in FIG. 8, the weaving method would be the most advantageous. Woven fabrics can be sewed together to form suitable electrode sheaths, as is well known, and such sheaths then treated according to the invention.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Process for the manufacture of a sheath for a storage battery electrode comprising:
    providing a tube of glass fiber fabric of glass fiber yarns,
    passing said tube along a mandrel which extends through a region containing fluidized powder particles of a thermoplastic material which particles are small compared with the diameter of the glass fiber yarns,
    heating said fabric while exposed to said fluidized thermoplastic material powder particles to cause said particles to adhere to the yarns of the fabric without bridging the space between yarns to cause significant reduction in porosity of said tube, thereafter cooling said tube; and cutting said tube into predetermined lengths.

2. Process as defined in claim 1 wherein the thermoplastic material is a polyolefin.

3. Process as defined in claim 2 wherein the polyolefin is polyethylene.

4. Process for making a battery electrode plate comprising the steps of:
    providing a plurality of rods of conductive material having a predetermined length;
    providing a tube of glass fiber fabric of glass fiber yarns;
    passing said tube along a mandrel which extends through a region containing fluidized powder particles of a thermoplastic material which particles are small compared with the diameter of the glass fiber yarns;
    heating said fabric while exposed to said fluidized thermoplastic material powder particles to cause said particles to adhere to the yarns of the fabric without bridging the space between yarns to cause significant reduction in porosity of said tube;
    thereafter cooling said tube;
    cutting said tube into predetermined lengths;
    inserting a predetermined cut length of said tube over each of said rods;
    filling the space between the outer rod surface and inner tube surface with active material; and
    joining a plurality of said rods to cross strips which are secured to the opposite ends of said rods to form an electrode plate.

References Cited
UNITED STATES PATENTS

| | | | |
|---|---|---|---|
| 2,847,496 | 8/1958 | Yamaura | 136—147 |
| 2,929,005 | 3/1960 | Lilienfeld | 117—126 GB |
| 2,981,783 | 4/1961 | Bushrod | 136—147 |
| 3,265,535 | 8/1966 | Sundberg | 136—147 |

DONALD L. WALTON, Primary Examiner

U.S. Cl. X.R.

136—63, 147